UNITED STATES PATENT OFFICE.

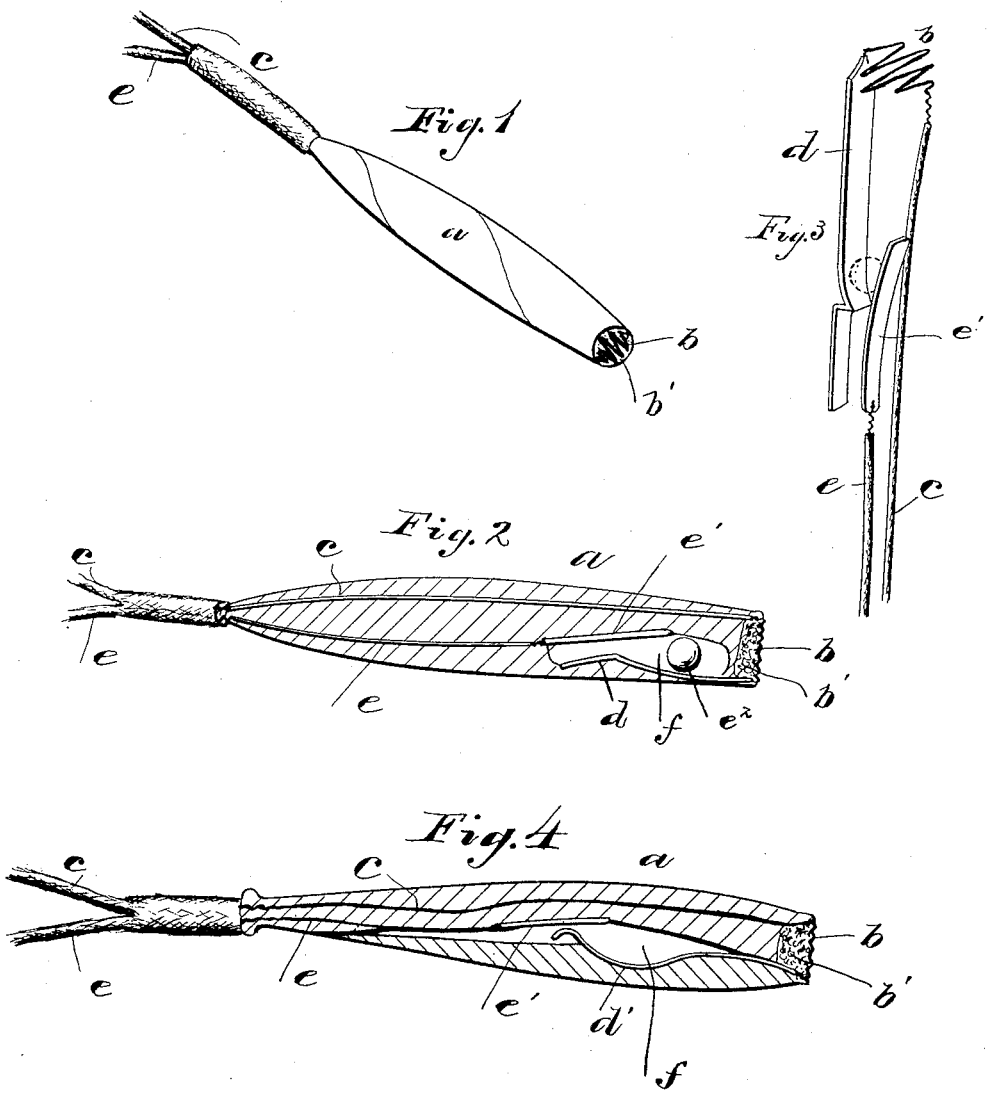

GEORGE NICHOLAS ENGERT, OF SPRINGFIELD, OHIO.

ELECTRIC CIGAR-LIGHTER.

SPECIFICATION forming part of Letters Patent No. 463,754, dated November 24, 1891.

Application filed December 24, 1890. Serial No. 375,751. (No model.)

*To all whom it may concern:*

Be it known that I, GEORGE NICHOLAS ENGERT, a citizen of the United States, residing at Springfield, in the county of Clark and State of Ohio, have invented certain new and useful Improvements in Electric Cigar-Lighters, of which the following is a specification.

The object of my invention is to provide a cigar-lighter which shall normally be inactive, but adapted to be automatically connected with a suitable electric circuit, and thus become an active agent when turned to the proper position for applying it to furnish light to the end of a cigar.

My invention consists in the various constructions and combinations of parts hereinafter described, and set forth in the claims.

In the accompanying drawings, Figure 1 is a perspective view of a device embodying my invention. Fig. 2 is a longitudinal sectional view of the same. Fig. 3 is a perspective view of the parts withdrawn from the casing, but shown in their relative operative positions. Fig. 4 is a sectional view of a modification.

Like parts are represented by similar letters of reference in the several views.

The operative parts of the device are preferably inclosed in an outer casing formed in the shape and about the size of an ordinary cigar. This outside casing $a$ may be formed of any suitable material, such as wood, hard rubber, and similar substances, a shield of wood covered with binding paper or cloth being preferably used, the preferable construction being one which will as closely imitate a cigar as possible, though it is obvious that the size, form, or material forms no important part of my invention.

The casing $a$ is made hollow at the enlarged or front end, and across the same extends a wire $b$ of platinum or other high-resistance metal, the wire being preferably extended from side to side and across the casing in a zigzag manner, as shown in Figs. 1 and 4, so as to be exposed at the end of the casing, the wire being partially surrounded and backed up by a filling of asbestus fibers $b'$ or similar non-combustible material. Extending backward through the casing from one end of the wire $b$ is a suitable electric conductor $c$, the other end of the wire being connected to a suitable metallic conducting-strip $d$, extending backward and secured within the casing, but normally electrically disconnected from the other parts thereof. Within the casing and opposite to the strip or plate is a second plate or conducting-strip $e'$, to which is connected a suitable wire or electric conductor $e$. The conductors $c$ and $e$ are preferably connected by means of a suitable flexible cord connection to any convenient source of electric supply.

Located within a suitable space or cavity $f$ within the casing $a$ and between the conducting-strips $d$ and $e'$ is a metallic ball $e^2$, adapted, as the casing $a$ is turned to an upright position, to roll between the strips $d$ and $e'$, and thus form an electrical connection between the same, causing the electric current from the conductors $c$ and $e$ to pass through the high-resistance wire $b$, heating said wire to an incandescent heat, from which a cigar may readily be lighted by placing the end of the cigar against the exposed surface of the wire $b$ in the same manner that a light would be obtained on one cigar from another lighted cigar.

In Fig. 4 I have shown the parts slightly modified. The ball $e^2$ is dispensed with. The metallic strip or plate $d$ is made in the nature of a spring, and the outer casing is formed in two parts, so connected together as to permit a slight movement one with the other. This is preferably accomplished by making the inner frame of two separate pieces and binding them together by an outside casing or wrapper of cloth or similar flexible material. The spring plate or conductor $d$ is connected to one part of said casing and bears against the other part, as shown, so that the resilience of the said plate or conductor keeps the parts slightly separated. Any outside pressure, however, on the outside of the casing $a$ tends to close the parts together, and thus brings the inner end $d'$ of the metallic strip $d$ in contact with the plate or conductor $e'$ and establishes a connection with the high-resistance wire $b$, as before.

The device, as thus described, is intended to be suspended from any suitable point by ordinary flexible conducting-cords attached to any convenient source of electric supply. The device hanging in its normal position is inactive; but the act of raising it to a position for accomplishing the purpose for which it is intended automatically produces an electrical contact, producing the necessary heat to obtain the desired result.

It will be seen by the construction, as thus described, that the outer casing is made to contain an automatic switch, which, in the normal position of the device, remains disconnected, and the lighter is therefore inactive, the switch being adapted to be automatically connected when the device is taken up and turned to an unusual position, thus bringing the lighter into active operation.

It is obvious that the device as thus described admits of many modifications in its construction. I do not therefore limit myself to the exact constructions herein set forth, but claim as my invention—

1. In a cigar-lighter, as described, a lighting or high-resistance conductor supported in an exposed position in a suitable frame, flexible electrical conductors connected to said frame to permit it to be turned to different positions, and an automatic switch within said frame or casing adapted to bring the lighting or high-resistance conductor into circuit with said flexible conductors by the act of bringing said casing to an unusual position, substantially as specified.

2. The combination, in a cigar-lighter, of the outer casing and a normally inactive high-resistance conductor, and a gravity-switch within said casing for bringing said conductor into electric circuit, substantially as specified.

3. The combination, with an outer casing and its electrical connection, of an exposed lighting or high-resistance conductor in said casing, and an automatic switch within said casing adapted to bring said high-resistance conductor into an electric circuit in the act of turning said casing to an unusual position, substantially as specified.

4. The combination, with an outer casing and the electrical connections thereto, of a high-resistance conductor permanently connected to one of said connections and normally disconnected from the other of said connections, said conductor being extended zigzag across an opening in said casing, and means within said casing for establishing an electrical connection for bringing said conductor into circuit, substantially as specified.

5. The combination, with an outer casing having electrical connections from a suitable source of electric supply, of a high-resistance conductor in said casing normally disconnected from the circuit of said electrical connections, and a gravity-switch within said casing adapted to automatically bring said high-resistance conductor into circuit when the casing is turned to an unusual position, substantially as specified.

6. The combination, with an outer casing having an exposed high-resistance wire at an opening in said casing, of non-combustible fibrous packing supporting said wire, electrical connections from the ends of said wire, and a gravity-switch within said casing for automatically bringing said high-resistance wire into circuit when the casing is turned to an unusual position, substantially as specified.

7. The combination, with an outer cigar-shaped casing having a high-resistance wire extending zigzag across the end of the same, of non-combustible fibrous material supporting said wire, and an automatic switch within said casing adapted to bring said wire into an electric circuit when the casing is turned to an unusual position, substantially as specified.

8. The combination, with a high-resistance conductor supported in a suitable casing and permanently connected at one end to a source of electric supply, of approximate electrical conductors, and a metallic ball located within said casing and adapted to roll into contact with said approximate electrical conductors, and thus establish a current through said high-resistance wire when the casing is turned to an unusual position, substantially as specified.

9. The combination, with an outer frame or casing containing approximate electrical conductors normally separated from each other, of a high-resistance wire connected at each end to the respective conductors, and a metallic ball located within said frame or casing and adapted, when said frame or casing is turned to an unusual position, to move in contact with said conductors and form an electrical connection between the same, substantially as specified.

In testimony whereof I have hereunto set my hand this 17th day of November, A. D. 1890.

GEORGE NICHOLAS ENGERT.

Witnesses:
W. M. PURSNELL,
ED. D. PATON.